Nov. 1, 1960 E. W. ULRICH 2,958,611
PRIMING OF ZINC SURFACES
Filed Oct. 5, 1956
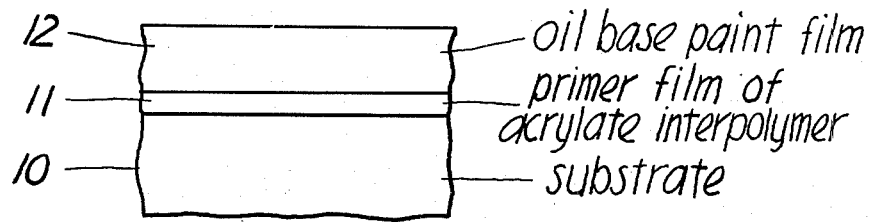
INVENTOR
ERWIN W. ULRICH
by Carpenter Abbott Coulter & Kinney
ATTORNEYS United States Patent Office 2,958,611
Patented Nov. 1, 1960

2,958,611

PRIMING OF ZINC SURFACES

Erwin W. Ulrich, Rosemount, Minn., assignor to Minnesota Mining and Manufacturing Company, St. Paul, Minn., a corporation of Delaware Filed Oct. 5, 1956, Ser. No. 614,190

4 Claims. (Cl. 117—75)

This invention relates to the priming of zinc surfaces such as are found on new galvanized iron, and has particular reference to the formation on such surfaces of permanently strongly bonded paint-receptive primer coatings. More broadly, the invention relates to the priming of metal and other surfaces prior to painting, and to novel primer compositions for such use.

Fresh zinc surfaces, as found on galvanized iron eavestroughs or gutters and other articles, cannot satisfactorily be painted directly with conventional oil base house paints. Paint films applied to such surfaces soon blister and come away from the metal surface. Prolonged weathering of the surface prior to painting improves the ability of the article to retain films of paint, but is obviously not a desirable procedure either economically or esthetically. Multiple prime coats have been tested, using phosphate, chrome, and other chemical components, but these systems have not been found fully effective and in addition call for excessive application time and labor. Two-part primer compositions, particularly those requiring the addition of quantities of zinc dust to a liquid vehicle just prior to application, have been moderately successful but still permit blistering and flaking of aged paint films; furthermore, the additional mixing step, and the instability of the mixed product, make this system uneconomical both of labor and of materials.

The present invention overcomes these deficiencies and disadvantages of prior art systems. There is provided a primer composition which is immediately ready for application to the fresh zinc or other surface without preliminary mixing, stirring, or other manipulation. The composition is in limpid liquid form and is easily applied by conventional brushing, spraying, or other methods. The freshly applied coating dries rapidly to form a strongly bonded thin continuous protective film. Oil base paints, and exterior surface coatings in general, are found to spread evenly over such film and to adhere strongly. Subsequent blistering or peeling is avoided; the paint film is retained on the surface even under drastic weathering. Superior priming action is obtained, and with unexpected economy of both materials and labor.

These advantageous results are achieved, in accordance with the invention, by employing as the primer composition a dilute solution in a volatile organic solvent of a resilient, adherent, resinous interpolymer of a long chain alkyl acrylate ester and a small proportion of acrylic acid. The following examples will further illustrate but not limit the invention.

*Example 1*

| | Parts by weight |
|---|---|
| Ethyl acetate | 60 |
| Fusel oil acrylate | 36 |
| Acrylic acid | 4 |
| Benzoyl peroxide | 0.3 |

Fusel oil acrylate is the acrylic acid ester of fusel oil, a commercially available mixture of alcohols which on analysis is found to contain approximately 55–80% primary amyl alcohols, 15–45% primary butyl alcohols, and 0–5% n-propyl alcohol.

The several components were placed in a glass-lined vessel under an inert atmosphere and held at 55–60° C. with continuous mild agitation until polymerization was essentially complete. Additional peroxide catalyst may be added, and the temperature may be increased, in order to speed the completion of the reaction. The viscosity increases as polymerization proceeds, and additional ethyl acetate was therefore added periodically and in amount sufficient to permit continued effective agitation. The resulting polymer solution was cooled and diluted with xylol to a polymer content of about 5%.

New galvanized iron, having an unweathered zinc surface was cleaned of coarse dirt and oil, e.g. by casual brushing with a solvent-moistened wiping rag, and was then primed with a brush coat of the polymer solution, dried, and overcoated in the usual manner with a commercial outside white primer coat and a linseed oil base outside white house paint. A similar panel prepared without the polymer prime coat as a control sample was found to blister badly on exterior exposure, whereas the panel of this example remained in excellent condition throughout more than 48 months of such exposure.

*Example 2*

| | Parts by weight |
|---|---|
| Ethyl acetate | 60 |
| Isooctyl acrylate | 36 |
| Acrylic acid | 4 |
| Benzoyl peroxide | 0.4 |

A polymer solution was prepared from the listed ingredients by the method described in connection with Example 1, and was diluted to a polymer content of about 4% with a mixture of one part turpentine, one part Cellosolve, and four parts mineral spirits. Non-weathered galvanized iron was directly coated with a thin brush coating of the solution and painted as in Example 1. After six weeks of exposure under a 250 watt sunlamp at a distance of 8 inches, the paint layer was found to be firmly adherently bonded to the primed panel, whereas with an unprimed control panel the paint could be readily chipped away after such exposure.

*Example 3*

| | Parts by weight |
|---|---|
| Distilled water | 104 |
| Wetting agent ("Triton X–200") | 8 |
| Isooctyl acrylate | 95.5 |
| Acrylic acid | 4.5 |
| t-Dodecyl mercaptan | 0.08 |
| Potassium persulfate | 0.2 |
| Sodium bisulfite | 0.067 |

The "Triton X–200" is identified as an aqueous 28% solution of an alkylated aryl polyether sodium sulfonate. Other suitable wetting agents may be employed in producing the dispersion.

The mixture was agitated under inert atmosphere at 30° C. in a glass vessel and produced a stable aqueous polymeric dispersion or latex, which was diluted to a polymer content of about 16% by addition of water, and applied to new galvanized sheet metal. The somewhat lower viscosity of the aqueous dispersion permitted the formation of a suitably thin coating even though the concentration of polymer was higher than in the previous examples. Paint films applied over the thus primed surface were found to adhere firmly under both outdoor weathering and accelerated test conditions.

*Example 4*

A mixture of 150 parts by weight of ethyl acetate, 96 parts of isooctyl acrylate, 4 parts of acrylamide, and 0.37 part of benzoyl peroxide was urged well with nitrogen and brought to 55° C. with agitation. Polymerization started after about one hour and the batch gradually thickened. An additional 0.25 part of benzoyl peroxide was added at 3-4 hours and a like quantity at 7-8 hours. Heating was continued for a further 6 hours. The mixture was then diluted with heptane to a coatable viscosity at a polymer concentration of about 6%. The solution was tested and found to be effective as a primer for oil base paints on fresh galvanized metal.

The foregoing examples illustrate specific compositions which have been found to be highly effective as primers for paint coatings on fresh galvanized metal surfaces, as already indicated. In general, useful results are similarly obtainable with interpolymers of acrylic acid or equivalent and monomeric esters of acrylic acid and certain non-tertiary alkyl alcohols, of which primary amyl alcohol and isooctyl alcohol are preferred examples. Other alcohols include isoamyl, 2-ethylbutyl, 3,5,5-trimethylhexyl, n-decyl, 2-ethylhexyl, and sec-heptyl alcohols. Mixtures of acrylate esters may likewise be found useful in preparing these primer compositions, as indicated in connection with Example 1. In all cases, the alcohol molecules contain from one to 14 carbon atoms, the average being about 4-10 carbon atoms. At least a major proportion of the alcohol molecules have carbon-to-carbon chains of at least four carbon atoms terminating at the hydroxyl oxygen atom, and each such chain contains at least about one-half the total number of carbon atoms in that molecule. Small amounts of certain other copolymerizable monomers, e.g. up to about 10% of vinyl acetate, may be present in these recipes without significantly altering the properties of the resulting primer.

The relative amount of acrylic acid in the polymerization formula is preferably within the range of about 5-10 percent of the total of acid and ester, although useful results are obtained within the broader range of about 3-12 percent.

Acrylamide is substituted for acrylic acid in the composition of Example 4, the resulting interpolymer providing good priming action. Methacrylic acid, methacrylamide, and itaconic acid may similarly be substituted. Ordinarily these components are more effective when interpolymerized with alkyl acrylates having the higher numbers of carbon atoms in the alkyl skeleton, whereas shorter chain esters appear to be more effectively interpolymerized with acrylic acid. Useful polymers may also be formed from alkyl acrylate and mixtures of these copolymerizable components.

In the application of these liquid primer compositions to zinc surfaces it is important that the dry film thickness be kept very low, e.g. in the range of 0.05-0.2 mil (.00005-0.0002 inch). At this thickness the primer forms a continuous coating over the entire zinc surface but the coating is surprisingly dry and non-sticky to the touch. Flat sheets of galvanized iron primed with such coatings do not adhere to each other even when pressed together at elevated temperatures, but instead fall apart when handled after such treatment. The thin, non-sticky primer coating provides an excellent base for the subsequently applied paint coating. At primer thicknesses of about 0.5 mil, on the other hand, the paint film shrivels and wrinkles during drying and does not develop secure anchorage to the primed surface. Primer films much thinner than about 0.02-0.05 mil are difficult to form on surfaces of materials such as zinc-galvanized iron, and do not provide effective priming action for paint films applied more than a few hours after priming. In order to ensure proper control of thickness, it is found necessary to apply these primer solutions at high dilutions, e.g. in the range of about 3-6% polymer, and preferably in the viscosity range of about 5-45 cps. as measured on the Brookfield viscometer. Considerable variation from the indicated concentration is possible when aqueous emulsions replace the organic solvent solutions, as indicated under Example 3; but it has been found that the intrinsic viscosity of the polymer should in general be within the range of about 0.7-2.5, indicating a medium high molecular weight. Preferred polymers have an intrinsic viscosity within the much narrower range of about 0.9-1.1.

In probable explanation of the effectiveness of these novel primer compositions on zinc surfaces, the following is suggested. The copolymers employed are presumably subject to a small degree of peroxidation. Oil base paints likewise are believed to dry and harden by a mechanism involving peroxidation. Hence it is suggested that a chemical bond is formed between the closely associated primer and paint layers. At the same time, it appears plausible to suggest that the free acid or equivalent groups of the primer form chemical bonds with the underlying metal surface. In any event, and regardless of theory, it has empirically been found that interpolymers as herein defined and described act as surprisingly effective primers for oil base paints on unweathered fresh zinc surfaces; whereas otherwise similar copolymers made, for example, with 50% rather than 5-10% of acrylic acid, or with ethyl acrylate in place of the higher acrylates as defined, or acrylate polymers made without acrylic acid or equivalent, have invariably failed to provide effective priming action under such conditions. Some utility has been exhibited by properly plasticized interpolymers of acrylic acid and lower alkyl acrylates such as ethyl acrylate. However these compositions should show a tendency to cause softening and eventual loosening of the overlying paint film, and hence appear to be less desirable where long-continued protection is desired.

While the primer compositions here defined have given outstanding results with oil base paints and zinc substrates, their utility is not limited thereto. These compositions are effective also as primers for bonding paint, lacquer, asphalt, and other organic coatings to wood, concrete, steel or chrome-plated steel, and many other porous and non-porous surfaces. Previously painted, varnished, or lacquered surfaces are also advantageously primed with these materials. Checked and cracked wood surfaces are not only primed but also effectively sealed when primed with these materials before painting.

In the attached drawing, there is illustrated in cross-section a solid substrate 10, which may be for example a section of fresh galvanized iron, primed with a thin film 11 of acrylate interpolymer as here defined, and coated with an outer surface layer 12 of oil base paint, the dried paint layer being firmly bonded to the substrate by the intervening thin primer layer.

Additives, such as pigments and dyes, may be included in small amounts in the primer compositions of this invention and are desirable for providing visual evidence of adequate coverage in the application of the primer to the desired surface.

What is claimed is as follows:

1. A structure including a solid substrate selected from the class consisting of metal, wood and concrete, and an in situ hardened organic protective surface coating, selected from the class consisting of paints, lacquers, varnishes and asphalt, firmly adherently bonded thereto by an intervening adherent, non-sticky, continuous layer, about 0.05-0.2 mil in thickness, of a resilient resinous interpolymer of monomers consisting essentially of about 5-10% by weight of acrylic acid and the remainder of monomeric acrylic acid ester of non-tertiary alkyl alcohol the molecules of which alcohol have from one to 14 carbon atoms, the average being about 4-10 carbon atoms, at least a major proportion of said molecules having a carbon-to-carbon chain of at least four carbon atoms terminating at the hydroxyl oxygen atom, said chain containing at least about one-half of the total carbon atoms in the molecule, and said interpolymer having an intrinsic viscosity of about 0.7-2.5.

2. A structure including a zinc substrate and an in situ hardened oil base paint film firmly adherently bonded thereto by an intervening adherent, non-sticky, continuous layer, about 0.05–0.2 mil in thickness, of a resilient resinous interpolymer of monomers consisting essentially of about 5–10% by weight of acrylic acid and the remainder of monomeric acrylic acid ester of non-tertiary alkyl alcohol the molecules of which alcohol have from one to 14 carbon atoms, the average being about 4–10 carbon atoms, at least a major portion of said molecules having a carbon-to-carbon chain of at least four carbon atoms terminating at the hydroxyl oxygen atom, said chain containing at least about one-half of the total carbon atoms in the molecule, and said interpolymer having an intrinsic viscosity of about 0.7–2.5.

3. The method of providing a permanent protective finish coat on a clean metallic substrate surface, comprising: priming the metal surface with a non-sticky continuous thin priming coat of a resilient adherent resinous interpolymer of monomers consisting essentially of about 3–12% by weight of acrylic acid and the remainder of monomeric acrylic acid ester of non-tertiary alkyl alcohol the molecules of which alcohol have from one to fourteen carbon atoms, the average being about 4–10 carbon atoms, at least a major proportion of said molecules having a carbon-to-carbon chain of at least four carbon atoms terminating at the hydroxyl oxygen atom, said chain containing at least about one-half the total number of carbon atoms in the molecule, said interpolymer having an intrinsic viscosity of about 0.7–2.5; applying over said priming coat a protective and decorative paint coating; and permitting in situ hardening of said coating.

4. The method of providing a permanent protective finish coat on a clean fresh zinc substrate surface, comprising: priming the zinc surface with a non-sticky continuous priming coat, about 0.05–0.2 mil in thickness, of a resilient adherent resinous interpolymer of monomers consisting essentially of about 3–12% by weight of acrylic acid and the remainder of monomeric acrylic acid ester of non-tertiary alkyl alcohol the molecules of which alcohol have from one to fourteen carbon atoms, the average being about 4–10 carbon atoms, at least a major proportion of said molecules having a carbon-to-carbon chain of at least four carbon atoms terminating at the hydroxyl oxygen atom, said chain containing at least about one-half the total number of carbon atoms in the molecule, said interpolymer having an intrinsic viscosity of about 0.7–2.5; applying over said priming coat a protective and decorative coating of oil base paint; and permitting said paint coating to dry and harden.

References Cited in the file of this patent

UNITED STATES PATENTS

| | | |
|---|---|---|
| 2,307,861 | Shapiro | Jan. 12, 1943 |
| 2,464,826 | Neher et al. | Mar. 22, 1949 |
| 2,754,280 | Brown | July 10, 1956 |
| 2,772,251 | Hansen | Nov. 27, 1956 |

FOREIGN PATENTS

| | | |
|---|---|---|
| 818,740 | France | June 21, 1937 |

OTHER REFERENCES

Science News Letter, vol. 52, No. 1, page 4 (July 5, 1947).